3,445,457
POLYVALENT ALKYLENEIMINE ADDUCTS OF
α,β-UNSATURATED ESTERS
Joseph Adrian Hoffman, Somerville, N.J., assignor to American Cyanamid Company, Stamford, Conn., a corporation of Maine
No Drawing. Filed Sept. 28, 1966, Ser. No. 582,527
Int. Cl. C07d 23/06; C08d 1/36
U.S. Cl. 260—239                              4 Claims

ABSTRACT OF THE DISCLOSURE

This invention relates to a compound of the formula:

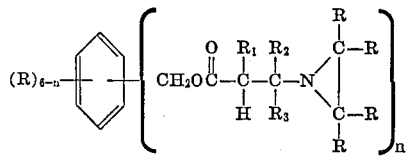

wherein R in each occurrence is selected from the group consisting of hydrogen and lower-alkyl; $R_1$, $R_2$, and $R_3$ are individually selected from the group consisting of hydrogen, halogen, lower-alkyl and phenyl; and $n$ is an integer of from 1 to 6.

The compounds of this invention, which contain one or more aziridinyl groups, are reactive monomers which can be used in the preparation of polymeric materials.

---

This invention relates to a new class of compounds. More particularly, it relates to 1-aziridinylpropionyloxymethyl derivatives of benzene of the formula

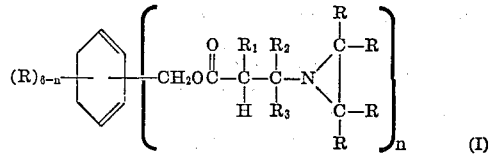

wherein R in each occurrence is either hydrogen or lower alkyl ($C_1$–$C_4$); $R_1$, $R_2$ and $R_3$ are individually selected from the group consisting of hydrogen, halogen, lower-alkyl ($C_1$–$C_4$) and phenyl; and $n$ is an integer of from 1 to 6. It also relates to a method of preparation of these compounds and to their use in the modification of various compounds, particularly elastomers.

The compounds of this invention can be prepared by reacting the corresponding halomethyl benzene (Formula II) with a salt of a suitable α,β-unsaturated acid (Formula III) to prepare the α,β-unsaturated ester (Formula IV) which is then reacted with suitable aziridine (Formula V) to produce the desired 1-aziridinylpropionyloxymethyl derivative of benzene.

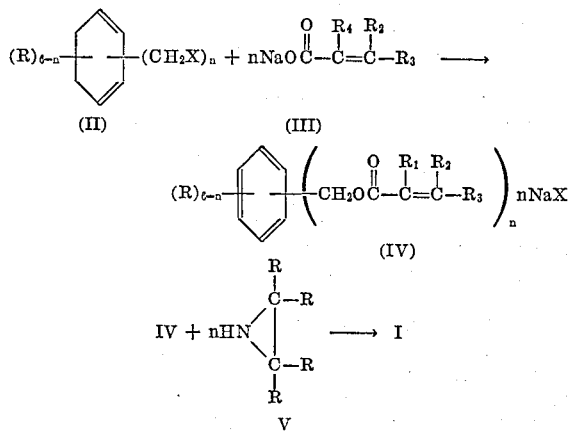

wherein R, $R_1$, $R_2$, $R_3$ and $n$ are as defined and X is halogen (chlorine, bromine, iodine).

The halomethyl benzenes (Formula II) can be prepared by reacting the corresponding benzene with formaldehyde and a hydrogen halide, such as hydrogen chloride or hydrogen bromide, according to the procedure described in U.S. Patent Nos. 2,945,894, 2,951,100, 2,973,391 and 3,069,480. Alternative procedures involve chlorination of the alkyl group or groups of benzene in the presence of suitable catalyst (U.S. Patent No. 2,926,202) or with chlorine sorbed on zeolite and under reactive conditions (U.S. Patent No. 2,956,084).

Example of halomethyl benzenes (Formula II) which may be used in making the α,β-unsaturated acid esters of Formula IV include chloromethylbenzene;

1,3-bis(chloromethyl)benzene;
1,4-bis(chloromethyl)benzene;
2,4-bis(chloromethyl)toluene;
3,6-bis(chlorobromomethyl)durene;
2,4,6-tris(chloromethyl)-1,3,5-trimethylbenzene;
bromomethylbenzene;
1,3-bis(bromomethyl)benzene;
1,4-bis(bromomethyl)benzene;
2,4-bis(bromomethyl)toluene;
3,6-bis(bromomethyl(durene;
2,4,6-tris(bromomethyl)-1,3,5-trimethylbenzene;
2,4,6-tris(bromomethyl)-1,3,5-triethylbenzene;
2,4,6-tris(chloromethyl)-1,3,5-tri-n-propylbenzene;
2,4,6-tris(bromomethyl)-1,3,5-tri-n-butylbenzene;
2,4,5,6-tetrakis(bromomethyl)-1,3-dimethyl)benzene;
2,3,4,5,6-pentakis(bromomethyl)toluene,
1,2,3,4,5,6-hexabromomethyl benzene, etc.

The α,β-unsaturated acids (Formula III) which may be reacted with compounds of Formula II as salts to form the esters of Formula IV include acrylic acid; 2-methylacrylic acid; crotonic acid; 2-methylcrotonic acid (including angelic and tiglic acid); 3-methylcrotonic acid; 2,3-dimethylcrotonic acid; 2-ethylacrylic acid; 2-ethylcrotonic acid; 3-bromocrotonic acid; 2-chlorocrotonic acid; cinnamic acid; 2-phenylcinnamic acid; etc. In forming the acid salt, a number of metals including the alkali metals, silver, mercury, copper, etc. as well as ammonia may be employed. However, for economy and minimum side effects, it is preferred to use the sodium or potassium salts.

Ethylenimines (Formula V) which may be reacted with the esters of Formula IV include ethylenimine; 1,2-propylenimine (2-methylaziridine); 1,2-butylenimine (2-ethylaziridine); 2,3-butylenimine (2,3-dimethylaziridine); 2-methyl-1,2-propylenimine (2,2-dimethylaziridine); 1,1,2,2-tetramethylethylenimine (2,2,3,3 - tetramethylaziridine), etc. Ethylenimines of the 2,2,3,3-tetraalkyl aziridine type may be prepared by the process described in J. Am. Chem. Soc., 82, 6088–70 (1960).

The reaction between halomethylbenzene and the salt of the α,β-unsaturated acid is carried out by contacting suitable quantities of each ingredient in the presence of a suitable solvent at an elevated temperature. The amount of acid salt employed will be dependent upon the amount of halomethylbenzene employed and the number of halomethyl substituents in the molecule. One mole of acid salt is required for each halomethyl substituent per mole of halomethylbenzene. It is generally preferred to use an excess of acid to ensure high yields. Such excesses may range from about 1 to about 50, preferably 5 to 20 mole percent.

The temperature of reaction may vary widely and will be influenced by the particular acid salt and halomethylbenzene employed as well as the solvent employed. In most instances, the temperature of reaction will be in the range of 50 to 250° C., but where possible the range of 100 to 200° C. is preferred.

The solvent employed as reaction medium may vary widely. The particular solvent chosen should be inert in the reaction or of such a nature that it will not lead to other than the desired product. A preferred solvent is the acid whose salt is used in the reaction, provided such acid is liquid at the reaction temperature. In other cases, dimethylformamide, dimethylsulfoxide, or dimethylacetamide are preferred. The amount of solvent employed will vary widely, but should be sufficient to provide a readily stirred mixture.

The reaction between acid salt and halomethylbenzene should be carried out until essentially complete. The time required for complete reaction will vary widely depending upon the specific reactants and the temperature of reaction. Times of from 1 to about 5 hours may be required, and times of about 3 hours have been found successful in some cases.

After the reaction is complete the product, the ester of Formula IV, is separated from the reaction mixture by suitable means. A convenient method is by drowning in water, neutralization with alkali, extraction with suitable solvent, drying to remove water, and stripping off the solvent. The particular method employed in recovering the ester intermediate is not a critical part of the present invention and other well known methods may be employed as desired.

The ester prepared in the manner described above is next reacted with an ethylenimine of Formula V at an elevated temperature to produce the desired aziridine adduct. The number of moles of imine employed per mole of ester involved will depend upon the number of ester groups present per mole of compound. Thus, where a tris ester is involved, three moles of imine per mole of compound are required. However, it is preferred to use an excess of imine, the excess serving as the reaction medium. Alternatively, an inert solvent of the type previously named, except for the acid, may be used as the reaction medium, in which case the excess of imine will be considerably reduced. In any case, the excess of imine should be above about 1 mole percent, preferably above 5 mole percent.

The temperature of reaction may be varied widely depending upon the specific reactants involved and the reaction medium. Generally, temperatures in the range of 30 to 150° C. are suitable with the range of 50 to 100° C. being preferred. The time of reaction will vary widely depending upon the reactants, the reaction medium, and the temperature. Generally, times of from about 1 to about 7 hours are sufficient, with times of 3 to 4 hours being preferable at the preferred temperature range.

The product may be isolated by any convenient means. Generally, the solvent is stripped off and the product is obtained as a viscous oil. During the stripping operation excess imine is also removed. The product obtained in this manner is generally of sufficient purity to be used directly for its intended uses.

The compounds of this invention contain one or more aziridinyl groups and are reactive with monomeric and polymeric compounds having reactive hydrogens, including alcohols, phenols, mercaptans, thiophenols, carboxylic acids, amines, etc. They are thus useful in the preparation of plastics and resins, textiles, varnishes, paper, etc. Their specific utility is determined to some extent by the number of aziridinyl groups present per mole of compound. Compounds containing a single aziridinyl group are not capable of cross-linking but may be used to modify the compounds with which they are reactive. In certain instances where a particular polymer contains many cross-linking sites and brittle structures may result from even modest use of cross-linking agent, it is sometimes preferable to first reduce the number of such sites by reaction with a monofunctional reactant and then cross-link, thus reducing brittleness. In other instances, it is possible to use a mixture of mono- and polyfunctional compounds to produce desirable polymeric structures. When a monomeric material is being chain-extended by reaction with a polyfunctional agent, it is sometimes desirable to add a moderate amount of a monofunctional coreactant in order to control or limit the molecular weight of the final polymer. The monofunctional compounds of the present invention are useful in any of these capacities.

Where the compounds of the present invention have more than a single aziridinyl group they may be used as chain-extending or cross-linking agents, depending upon the particular monomer or polymer involved. Where the monomer or polymer contains more than two reactive groups per molecule, the compounds of the present invention that contain more than one aziridinyl group per molecule are all capable of cross-linking said monomer or polymer, and at the same time may serve as chain extenders.

The compounds of this invention are effective as curing agents or in compositions useful as curing agents for vulcanizable rubbery materials which serve as binders in solid rocket propellant compositions. Rubbery materials include homoplymers of conjugated dienes and copolymers of conjugated dienes with materials copolymerizable therewith (as shown in U.S. Patent 3,087,843). Of particular interest is their use in propellant compositions comprising an inorganic oxidizing salt and either a synthetic acid-terminated polymeric binder or a synthetic copolymer of a conjugated diene and an unsaturated carboxylic acid (see U.S. Patent 3,087,844). The first type of polymer may be exemplified by the formula

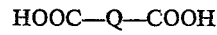

HOOC—Q—COOH wherein Q is a polymer chain, as, for example, a polymer of a conjugated diene such as 1,3-butadiene. The second type of polymer may be exemplified by a copolymer of 1,3-butadiene and acrylic acid. Compounds of the present invention which contain three or more aziridinyl groups are necessary to cross-link polymers of the first type, while compounds of the present invention which contain two or more aziridinyl groups will cross-link polymers of the second type. In either case, compounds of lesser functionality may be employed to modify the physical properties of the polymer in question as previously discussed.

Utility of the compounds of the present invention as curing agents for vulcanizable rubbery materials is surprising in view of the fact that many known polyalkylenimine compounds are unstable and undergo polymerization on standing, whereas the present compounds are stable at room temperature for long periods. An advantage of the compounds of the present invention is the fact that they are liquids or low melting solids and are readily incorporated into the vulcanizable rubbery material. The is not true of other polyalkylenimine compounds such as triethylene melamine, tripropylene melamine, etc, which are solids and require elevated temperatures for uniform incorporation into the vulcanizable rubbery polymer. The need for elevated temperatures not only is inconvenient but is hazardous and gives rise to the possibility of premature gelling of the polymer composition. It is necessary that the propellant composition after addition of the curing agent thereto and thorough blending have an adequate induction period before gelation so that transfer can be made to the fuel chamber. Heating of the propellant composition in the presence of the curing agent can reduce this induction period to the point where such transfer cannot be completed.

In the following examples, the parts and percentages are by weight unless otherwise indicated. These several examples are not intended to limit the invention in any manner but merely to illustrate a preferred mode of its practice and present a typical embodiment thereof. For a proper definition of the scope of the invention recourse must be made to the several appended claims.

EXAMPLE 1

Preparation of 2,4,6-tris(crotonyloxymethyl)-1,3,5-trimethylbenzene

Into a suitable reactor was charged 15.0 parts (0.14 mole) of sodium crotonate, 75 parts of crotonic acid and 17.0 parts (0.042 mole) of 2,4,6 - tris(bromomethyl)-1,3,5-trimethylbenzene made by the procedure of U.S. Patent No. 3,168,580. The above mixture was stirred and heated to 150–160° C. and held at this temperature for about 3–4 hours. The solution was then cooled to 90° C. and poured into 1500 parts of water containing 90 parts of sodium bicarbonate with rapid stirring. The product was then extracted with three 150 milliliter portions of ether. The combined extracts were dried over anhydrous calcium chloride and then stripped of solvent under vacuum. The product was obtained in crude form as a tan powdery solid. It was recrystallized from ethanol using activated charcoal to decolorize. There was obtained 10 parts of product as white needle crystals having a melting point of 112–114° C.

EXAMPLE 2

Preparatoin of 2,4,6-tris-3-(2-methyl-1-aziridinyl)butyl-oxymethyl-1,3,5-trimethylbenzene To 5.0 parts (0.088 mole) of 1,2-propyleneimine in a suitable reactor was added 2.0 parts (0.005 mole) of the product of Example 1. The resulting solution was heated to about 70° C. and held at this temperature for about 3–4 hours. The excess imine was then stripped off under vacuum and the desired product was obtained as an almost colorless heavy oil. The product was of sufficient purity to be used in the curing of elastomers without further handling. Assay by titration indicated a purity of 93.1 percent.

EXAMPLE 3

To 10.0 parts (5.1 milliequivalents) of a carboxy-terminated polybutadiene of molecular weight 3854 was added 1.0 part (5.1 milliequivalents) of the product of Example 2. The mixture was stirred to ensure thorough blending and then placed in an oven at 65° C. After 3–4 days the mixture had cured to a non-tacky elastomer.

EXAMPLE 4

Reaction of dibromomethyl durene and sodium crotonate

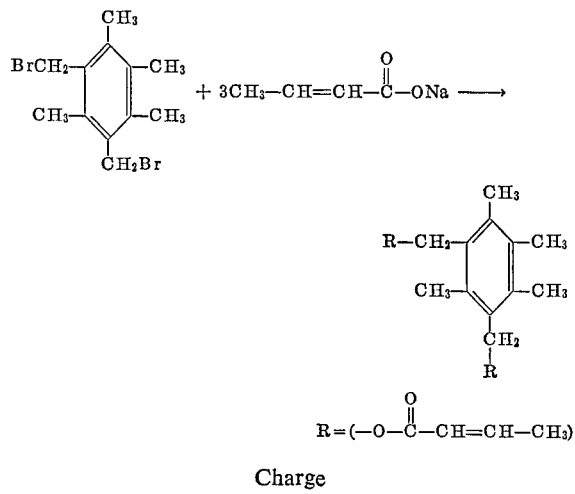

Charge

| | |
|---|---|
| Sodium crotonate (0.07 mole) | 7.56 |
| Dibromomethyl durene (0.03 mole) | 9.72 |
| Crotonic acid (0.465 mole) | 40 |

The above mixture was heated to a melt at 160° C. and cooled to 150° C. and held at 150° C. for 1 hour and allowed to cool overnight.

The mixture was reheated to 160° C. and held for 3 hours at this temperature. The mixture was then cooled to 100° C. and poured into a solution containing 42 g. NaHCO₃ in 4,000 ml. water. The solid which separates was filtered, washed with water and soaked dry to give a tan solid. This was recrystallized from isopropyl alcohol and Darco to give a white crystalline solid. The product was vacuum dried overnight to give 6.3 product.

EXAMPLE 5

Preparation of the diester adduct with propyleneimine: 1,3 - bis (3 - (2 - methyl - 1 - aziridinyl) butyryloxymethyl) - 2,4,5,6, - tetramethylbenzene Reaction of dicrotonate and propyleneimine

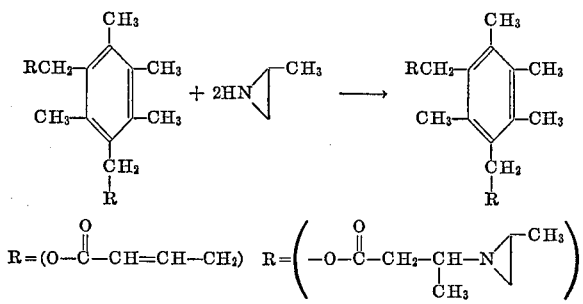

Charge

| | Grams. |
|---|---|
| Dicrotonate | 0.5 |
| Propyleneimine | 0.3 |

The above mixture was warmed until solution took place and held at 50°C. for ½ hour. It was then allowed to stand at room temperature for 2 hours and then placed under vacuum over the weekend. There remained a colorless oil which partially crystallized on standing.

EXAMPLE 6

Preparation of 1,2,4,5 - tetrakis (3 - (2 - methyl - 1 - aziridinyl) - butyryloxymethyl) benzene Reaction of α′,α,α″,α‴ - tetracrotonate ester of durene and propyleneimine.

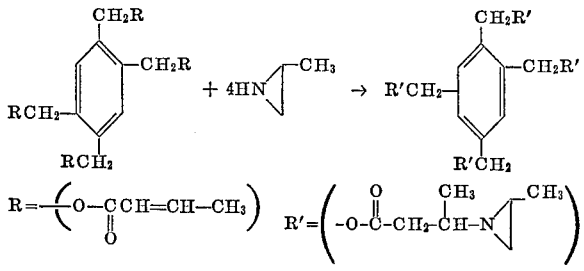

Charge

| | Grams |
|---|---|
| Tetracrotonate (0.01 mole) g | 4.70 |
| Propyleneimine (8.0 g.) ml | 10 |

The ester was added to the imine with stirring to give a thick slurry. The mixture was then heated briskly on the water bath with stirring constantly at 40°C. and held overnight. The excess imine reactant was stripped off to give a clear viscous oil. This was filtered through a suitable filtering agent such as Hyflo. An infrared spectral analysis of the olefin absorption observed in the stirring tetraester.

EXAMPLE 7

Preparation of hexakis (3 - (2 - ethyl - 1 - aziridinyl) butyryloxymethyl) benzene Reaction of hexacrotonate and butyleneimine

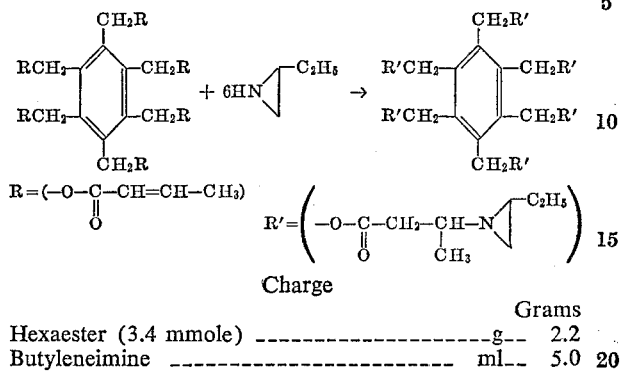

Charge

|  | Grams |
|---|---|
| Hexaester (3.4 mmole) _____g__ | 2.2 |
| Butyleneimine _____ml__ | 5.0 |

The hexaester was added to the butyleneimine with stirring. The solid ester did not dissolve immediately. It was warmed with stirring at 40°C. and after about 15 minutes gave a clear solution. The solution was held at that temperature overnight.

The excess imine was stripped off and the residue filtered through Hyflo. There was obtained a clear viscous liquid.

In infrared spectrum showed the absence of olefin absorption.

Another advantage of said compounds disclosed herein, is the fact that many of these derivatives have a surprisingly slow rate of cure compared to other aziridine cross-linking agents. This can be highly advantageous in preparing certain propellant mixtures, especially the large rocket motors which require considerably more time in the various operations. Furthermore, the curing time can be reduced proportionately by heating or by the use of a suitable catalyst.

I claim:
1. A compound of the formula

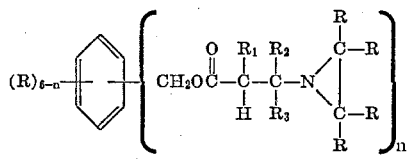

wherein R in each occurrence is selected from the group consisting of hydrogen and lower alkyl; $R_1$, $R_2$, and $R_3$ are individually selected from the group consisting of hydrogen, halogen, lower alkyl and phenyl; and $n$ is an integer of from 1 to 6.

2. A compound of claim 1 which is specifically 2,4,6-tris [3 - (2 - methyl - 1 - aziridinyl - 1) butyryloxymethyl)] - 1,3,5 - trimethylbenzene.

3. The compound according to claim 1 where $n$ is 4.

4. The compound according to claim 1 wherein $n$ is 6.

References Cited

UNITED STATES PATENTS 2,596,200    5/1952    Bestian.

ALTON D. ROLLINS, *Primary Examiner.*

U.S. Cl. X.R.

260—82.1, 94.2, 430, 431, 438.1, 515, 526, 539, 651